Sept. 20, 1932. F. SEAVER 1,878,297
APPARATUS FOR PROCESSING FOODSTUFFS WITH FLUID CURRENTS
Filed July 8, 1929 2 Sheets-Sheet 1
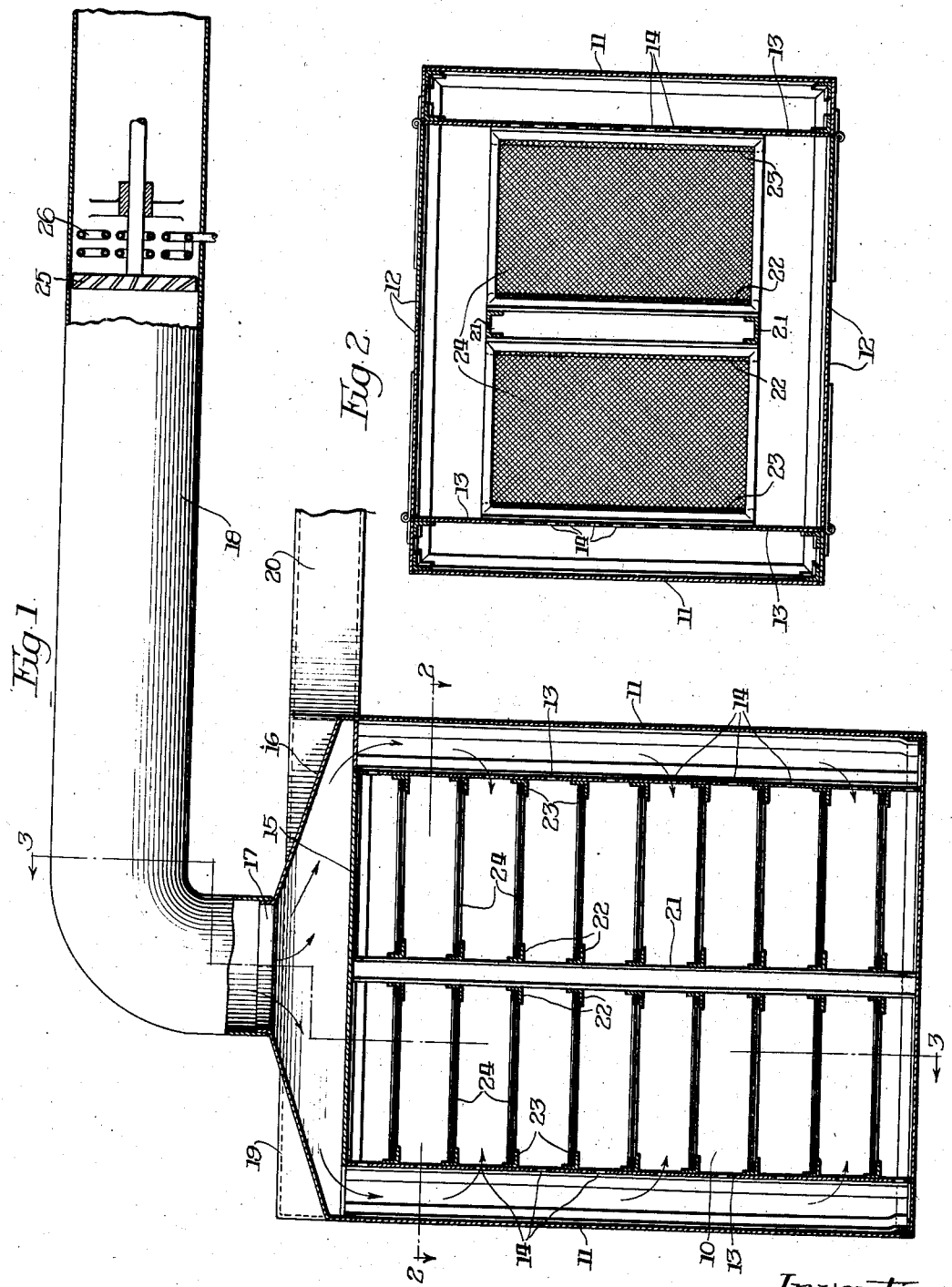
Inventor
Floyd Seaver,
By Wilkinson, Huxley, Byron & Knight, Attys

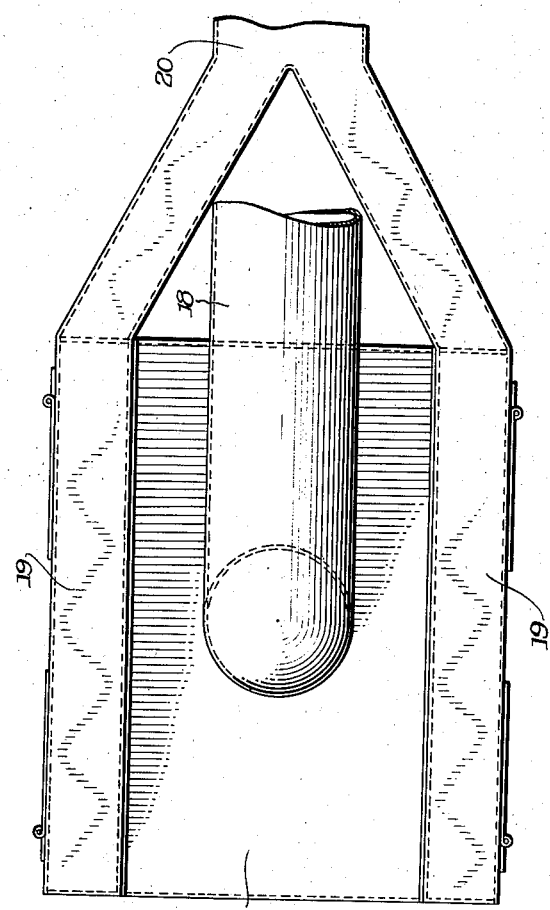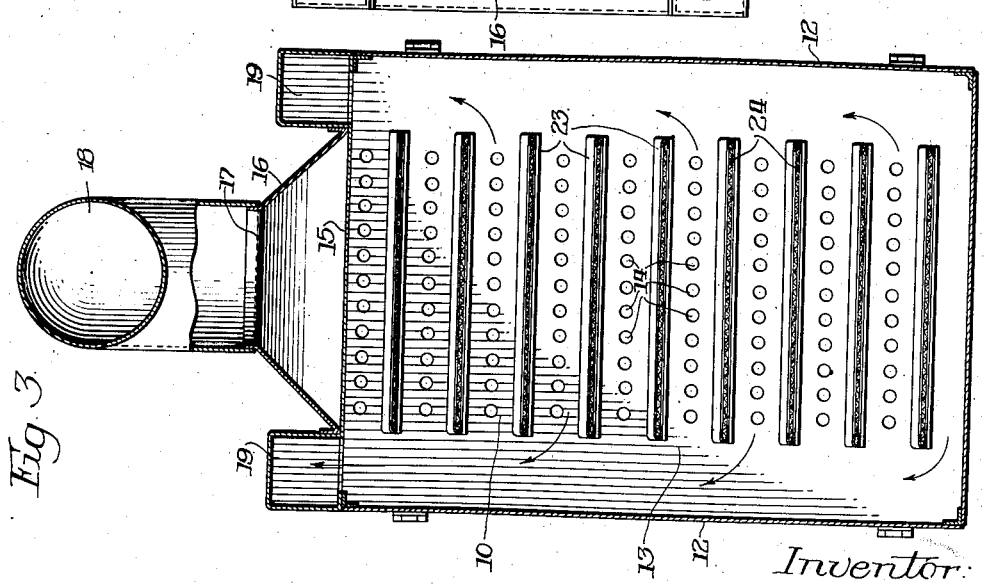

Patented Sept. 20, 1932

1,878,297

UNITED STATES PATENT OFFICE

FLOYD SEAVER, OF CHICAGO, ILLINOIS, ASSIGNOR TO SWIFT AND COMPANY, OF CHICAGO, ILLINOIS, A CORPORATION OF ILLINOIS

APPARATUS FOR PROCESSING FOODSTUFFS WITH FLUID CURRENTS

Application filed July 8, 1929. Serial No. 376,800.

This invention relates to improved mechanisms by which foodstuffs may be prepared for packing, shipment, market, storage and further processing by a novel method described and claimed in the applicant's co-pending application, Serial No. 376,799, filed July 8th, 1929.

As pointed out in said co-pending application, the process applies particularly to foodstuffs of the type, which upon periods of exposure to temperatures above certain predetermined relatively low temperatures, for predetermined periods of time, are subject to spoilage and deterioration. The process described and claimed in said co-pending application, involves the chilling of foodstuffs in an extremely short period of time, or in other words, at a rate sufficient to effectively check bacterial propagation under the conditions of said changing temperatures.

It is known that the spoilage of foodstuffs is due to contamination, generally spoken of as "surface contamination" occasioned by human handling, and that the deterioration thereof is caused by the presence of a relatively large number of bacteria which have increased over the original contamination, by propagation. It is also understood that propagation of the bacteria takes place at a given rate at any particular period within a prescribed range and consequently, if the foodstuff is permitted to remain at a temperature at which propagation may take effect, an increase in the number of bacteria will result.

The process referred to in said co-pending application therefore, aims to effect the cooling or chilling of the foodstuff at a rate so rapid that there is substantially no increase in the number of bacteria over the original contamination during the period that the foodstuff is brought to a temperature at which no further propagation will occur. Although various devices may be employed for practicing this invention, the applicant defines and claims herein, one apparatus which not only effectively performs the cooling operation referred to, but makes for many other advantages hereinafter pointed out.

Accordingly, an object of this invention is to provide a compact, simple, inexpensive and yet efficient mechanism for practicing the cooling method referred to and also to provide the mechanism which is of such construction that the air currents will follow a definite and predetermined path by which they will have a maximum cooling effect upon the foodstuffs.

In carrying out this last enumerated advantage, it is a further object to provide a device which may be readily charged and emptied with the foodstuff under treatment and to support such foodstuff whereby it will have the desired exposure to the blast of chilling air and at the same time, one in which the outlets for the air are so directed over each section of the supporting trays that the opening of the door for the purpose of adding or removing a tray, does not materially disturb the distribution of air over the other trays, nor does the absence of one or more of the trays disturb the flow of air over the other trays.

In order to better understand the present invention, one particular embodiment thereof is hereafter given by way of illustration, but it is to be understood that this illustrated form is not to be considered as limiting the invention in any respect, as the scope of the invention should be determined from an understanding of this disclosure and an appreciation of the advantages which the invention produces therein. The following disclosure will be more clearly understood by referring to the drawings in which:—

Figure 1 is a front elevational view partly in cross section, disclosing the interior of a chamber constructed in accordance with the present invention.

Figure 2 is a plan view in cross section, taken on the line 2—2 of Figure 1 and looking in the direction of the arrows.

Figure 3 is an elevational view in cross section, taken on the line 3—3 of Figure 1 and looking in the direction of the arrows, and Figure 4 is a plan view of the device shown in Figure 1.

Referring to the drawings, it will be noted that the apparatus of the present invention is illustrated as comprising a cooling chamber or room 10, having outer walls 11 at its ends, and doors 12 at its front and back sides. Spaced inwardly of the end walls 11 are vertical walls 13 provided with rows of perforations 14, spaced so as to provide a row of perforations for each of the shelves hereinafter described.

Extending across the tops of the inner walls 13 is a roof or top portion 15. Positioned above the roof, or top wall 15 is a hood 16, having an upward extending flange 17 adapted to receive the pipe 18. The hood, it will be noted, does not extend to the front and rear side walls of the chamber or room, but space is provided on either side thereof for the air passages 19, which join with each other to form the air outlet passage 20.

Centrally of the chamber, are vertical studdings 21 having on their opposite sides, racks 22. Carried on the inner surface of the inner walls 13 are racks 23. The racks 22 and 23 serve as supports for suitable shelving 24 which may be of any suitable construction but are illustrated in the present example as being made of screening. These of course, are of sufficient strength to support the foodstuff thereon and are preferably open in a manner to permit the free passage of air therethrough.

The pipe 18 is a conduit through which air is introduced at a relatively low temperature and at high velocity. It is of course obvious, that any suitable means may be employed for supplying the air in this manner, but as an element of the combination the fan 25 is shown as one means which may be employed for creating the air velocity and the coils 26 represent cooling coils for reducing the temperature of the air to the desired extent. The elements 25 and 26 are only diagrammatic representations of any suitable means which may be employed for this purpose.

The fan may be driven by a motor or other source of power not shown. It is to be understood at this point, that if the apparatus is to be employed in de-frosting operations, it will then of course, be necessary to provide means similar to coils 26 for heating the air to be blasted to the desired temperature.

In practicing the invention, the shelves are to be charged through the doors 12 and if desired, the foodstuff may be introduced in the front, for instance, and removed from the back but of course the charging and removal may be accomplished from the same side. The foodstuff, such as cuts of meat, for instance, are preferably placed on the shelves in spaced relation, so as to provide a maximum of exposure with a maximum conservation of space and when the chamber is completely charged and the doors closed, the current of chilled air is turned on so that it is caused to circulate through the chamber over the meat and out through the air outlet passage.

The passage of air which is supplied through the pipe 18 comes in contact with the foodstuff by travelling first through the hood 16 and down the side passages provided between the walls 11 and 13 and in through the passages 14 and over the various trays in contact with foodstuff placed thereon, all as indicated by the arrows in Figure 1. The air then travels outwardly toward the front and back of the container upwardly and out through the air passages 19 and 20 as indicated by the arrows in Figures 3 and 4.

It is obvious that a maximum cooling effect is realized and that by employing the air current at the velocity and temperature described, that the improved advantageous results of the present invention are realized. It will also be obvious that by employing this process and the apparatus described, that a tremendous saving is effected due to the reduction in labor, conservation of space and reduction in installation and maintenance cost.

Although the invention herein set forth is described as being particularly applicable to the chilling process defined in the applicant's co-pending application, it is obvious that its advantages reside in its arrangement and construction which renders it also serviceable for use in de-freezing operations for foodstuffs. In such cases, instead of the refrigerating coils, suitable heating coils should be provided whereby the fan would direct a blast of hot or warm air through the chamber or cabinet in exactly the same manner. It is of course, to be understood, that it is within the scope of the present invention to provide insulating material around the chamber for the purpose of preventing the passage of heat through the walls thereof either inwardly, in the case of chilling operations, or outwardly, as in the case of de-freezing operations.

This feature will also depend somewhat upon the surroundings, as insulation materials should be employed in accordance with the tendency for heat to enter or escape from the chamber.

From the above disclosure, it will be obvious that an apparatus is provided which will accomplish the various objects specified for it, and also one by which the applicant's improved method of chilling may be accomplished. It is to be understood that various modifications and changes may be made, such as will fall within the spirit of the present invention.

It is to be further understood that the trays may be supplied as parts of a truck or car moving on tracks, and adapted to be loaded and unloaded and moved into and out of the chamber, without departing from the spirit of the invention.

The scope of the present invention is particularly pointed out in the appended claim.

I claim:

An apparatus of the character described comprising a rectangular chamber having side, top and bottom walls, a back wall and a door opposite said back wall, a plurality of superimposed spaced article supporting trays supported between said side walls of less depth than the distance between said back wall and said door, whereby to provide discharge passages in front and back of the column of superimposed trays, fluid compartments on the outside of said side walls having communication with said chamber through openings in said side walls located at the space between said trays, fluid conveying flues connected with the tops of said fluid compartments and said discharge passages, whereby processing fluids may enter said compartments from one of said flues, pass downwardly and thence through the space between said trays, forwardly and backwardly of said chamber and upwardly through said discharge passages and out of the other of said flues.

Signed at Chicago, Illinois, this 1st day of July, 1929.

FLOYD SEAVER.